United States Patent

Yamada et al.

Patent Number: 5,589,527
Date of Patent: Dec. 31, 1996

[54] PIGMENT GRINDING RESIN FOR ELECTRODEPOSITION PAINT AND PIGMENT PASTE CONTAINING THE SAME

[75] Inventors: Mitsuo Yamada, Suita; Hiroyuki Nojiri, Takatsuki, both of Japan

[73] Assignee: Nippon Paint Co., Ltd., Osaka-fu, Japan

[21] Appl. No.: 370,105

[22] Filed: Jan. 9, 1995

[30] Foreign Application Priority Data

Jan. 10, 1994 [JP] Japan ................. 6-000785

[51] Int. Cl.$^6$ ................. C08K 3/20; C08L 63/02
[52] U.S. Cl. ................. 523/414; 523/415; 205/317
[58] Field of Search ................. 523/414, 415; 204/181.4, 181.7

[56] References Cited

U.S. PATENT DOCUMENTS 5,401,782  3/1995  Kawakami et al. ................. 523/415

FOREIGN PATENT DOCUMENTS

| 0251772 | 1/1988 | European Pat. Off. . |
| 0352677 | 1/1990 | European Pat. Off. . |
| 0625530 | 11/1994 | European Pat. Off. . |
| 2329727 | 5/1977 | France . |
| 2363074 | 4/1975 | Germany . |

OTHER PUBLICATIONS

Database WPI, Week, 9423, Derwent Publications Ltd., London, GB: AN 94-189024.

Primary Examiner—Melvyn I. Marquis
Assistant Examiner—D. Aylward
Attorney, Agent, or Firm—Wenderoth, Lind & Ponack

[57] ABSTRACT

A pigment grinding resin of the formula:

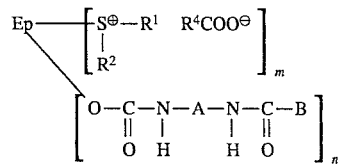

wherein, Ep is a residue of an epoxy resin having an epoxy equivalent of 150 to 2000 and a hydroxyl group equivalent of 300 to 4000; $R^1$ represents a hydrophilic group selected from a 2-hydroxyethyl group and a group of the formula $-CH_2CH(OH)CH_2R^3$ wherein, $R^3$ is a hydroxyl group or a hydroxylalkyl group having 1 to 10 carbon atoms; $R^2$ represents a hydrophilic group selected from 3-hydroxypropyl, 2-hydroxypropyl and 4-hydroxybutyl; $R^4$ is a hydrogen atom or an alkyl, hydroxylalkyl or alkylamide group having 1 to 5 carbon atoms; m is a numerical value of 0.1 to 2.0; A is residue of a diisocyanate; B is a residue of an alcohol, an amine, a carboxylic acid, an oxime and a caprolactam having 1 to 20 carbon atoms; and n is a numerical value of 10.1 to 2.0. The pigment grinding resin of the present invention has excellent dispersibility. This invention provides a pigment grinding resin and pigment paste capable of affording a coated film having good appearance and corrosion resistance.

9 Claims, No Drawings

PIGMENT GRINDING RESIN FOR ELECTRODEPOSITION PAINT AND PIGMENT PASTE CONTAINING THE SAME

FIELD OF THE INVENTION

The present invention relates to a pigment grinding resin which can suitably be used as a pigment grinding agent for an electrodeposition paint, and to a pigment paste containing the same.

BACKGROUND OF THE INVENTION

Electrodeposition coating is a method wherein aqueous paint is filled in a tank and paint components are electrophoretically moved and deposited onto a surface of an object to be coated present in the tank. The main application of this electrodeposition coating is anti-corrosion coating of car bodies and it is industrially important.

In general, an electrodeposition paint contains a pigment and a pigment grinding agent. In order to introduce a pigment into paint, a pigment paste obtained by grinding the pigment in an aqueous medium at a high concentration is used as an intermediate composition. To the pigment paste, a dispersing agent is formulated to give sufficient dispersion stability to the pigment paste. The dispersing agent is required to have the characteristic to increase the dispersion stability of the pigment paste as well as performances to keep the paint stable for a prolonged period when the pigment paste is made into an electrodeposition paint by diluting it with an aqueous medium. In recent years, a cationic resin is generally used for the pigment grinding agent of electrodeposition paint.

For example, in Japanese Patent Publication Nos. 53-47143 and 54-4978, there is disclosed a cationic resin used as a grinding agent for the electrodeposition paint. Further, in Japanese Patent Laid-Open Publication No. 1-182377, there is disclosed a cationic resin which also functions as a catalyst in the curing reaction between an α,β-unsaturated carbonyl group and a hydroxyl group. In this reference, a cationic resin containing a tertiary sulfonium salt is disclosed, which has suitable basic for catalyst and an inhibitor effect under a corrosive atmosphere.

Furthermore, in Japanese Patent Laid-Open Publication No. 63-23919, there is disclosed a sulfonium resin which is useful as a pigment grinding and spreading agent in view of its corrosion resistance, and a cationic resin containing a tertiary sulfonium salt derived from thiodiethanol is described as a most preferred example.

However, the pigment grinding resin disclosed in this reference has a problem in that it does not provide good appearance to the resulting coated film.

SUMMARY OF THE INVENTION

In accordance of the present invention, there is provided a pigment grinding resin represented by the formula:

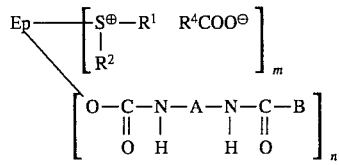

wherein, Ep is a residue of an epoxy resin having an epoxy equivalent of 150 to 2000 and a hydroxyl group equivalent of 300 to 4000; $R^1$ and $R^2$ represent a different group each other and respectively selected from the group consisting of hydroxymethyl, 2-hydroxyethyl, 2-hydroxypropyl, 3-hydroxypropyl, 4-hydroxybutyl and a group of the formula— $CH_2CH(OH)CH_2R^3$ (wherein, $R^3$ is a hydroxyl group or a hydroxyalkyl group having 1 to 10 carbon atoms); $R^4$ is a group selected from the group consisting of a hydrogen atom and alkyl, hydroxyalkyl and alkylamide groups having 1 to 5 carbon atoms; m is a numerical value of 0.1 to 2.0; A is a residue of a diisocyanate selected from the group consisting of aliphatic, alicyclic and aromatic diisocyanates having 4 to 20 carbon atoms; B is a residue of a compound selected from the group consisting of an alcohol, amine, carboxylic acid, oxime and a caprolactam having 1 to 20 carbon atoms; and n is a numerical value of 0.1 to 2.0.

A pigment grinding resin of the present invention has excellent dispersibility. This invention provides a pigment grinding resin and a pigment paste capable of affording a coated film having good appearance and corrosion resistance.

DETAILED DESCRIPTION OF THE INVENTION

It is preferred that the pigment grinding resin of the present invention has a tertiary sulfonium group value of from 30 to 500, particularly 50 to 150. When the tertiary sulfonium group value is larger than 500, the corrosion resistance of the resulting coated film may become poor. On the other hand, when it is smaller than 30, the stability of the resulting pigment paste may become poor. The tertiary sulfonium group value in the present invention may be defined as the milliequivalent of the sulfonium group per 100 g of the resin. It is preferred that the pigment grinding resin of the present invention has a blocked isocyanate group equivalent of from 100 to 40000, particularly 300 to 4000. When the blocked isocyanate group equivalent is larger than 40000, the hydration stability becomes poor. On the other hand, when it is smaller than 100, the pigment dispersibility of the resulting resin may become poor.

The pigment grinding resin of the present invention is prepared preferably by reacting a blocked isocyanate-modified epoxy resin with a sulfide corresponding to the above tertiary sulfonium group. This reaction is usually conducted by mixing the blocked isocyanate-modified epoxy resin, sulfide, acid and deionized water with stirring at a reaction temperature of 50° to 80° C., preferably 60° to 75° C. Regarding preferred reaction proportion, an amount of the sulfide is 1 to 4 equivalents based on the epoxy group of the blocked isocyanate-modified epoxy resin. The epoxy group may be remained after the completion of the reaction, but it is necessary that at least 10% of epoxy groups in a molecule is converted to the sulfonium group. It is considered that the residual epoxy group is reacted with water to give two hydroxyl groups when it is dispersed into water.

As to the acid, there can be used those which can be a counter anion of sulfonium. Examples thereof include formic acid, lactic acid, acetic acid, propionic acid, butyric acid, dimethylolpropionic acid, N-acetylglycine, N-acetyl-β-alanine, boric acid, phosphoric acid, hydrochloric acid, sulfuric acid and the like. However, when an inorganic acid is used, a halide compound which deteriorates corrosion resistance of the coated film may be included, therefore, organic acids such as formic acid, lactic acid, acetic acid, propionic acid, butyric acid, dimethylolpropionic acid, N-acetylglycine, N-acetyl-Bβ-alanine and the like are preferred. Among them, dimethylolpropionic acid and N-acetyl-β-alanine are particularly preferred.

The blocked isocyanate modified epoxy resin used in the present invention can be obtained by reacting the epoxy resin with the half-blocked diisocyanate. The reaction is conducted by a conventional method. It is preferred that the reaction is conducted using the epoxy resin and half-blocked diisocyanate in an equivalent ratio of 1:1 to 1:2. In this reaction, the hydroxyl group of the epoxy resin may be remained, but it is necessary that at least 10% of hydroxyl groups in a molecule is reacted with the half-blocked diisocyanate. Usually, the reaction is conducted at a temperature of about 140° C.

The half-blocked diisocyanate with which the above epoxy resin will be reacted in order to prepare the modified epoxy resin can be obtained by reacting polyisocyanate with a compound having active hydrogen. It is preferred that this reaction is conducted by cooling to 40° to 50° C. while dropping an active hydrogen-containing compound under stirring, if necessary, in the presence of a tin catalyst. Regarding a reaction proportion of the polyisocyanate to active hydrogen-containing compound, a proportion of the active hydrogen-containing compound can be determined according to stoichiometric calculation so that an amount of the unblocked isocyanate group per molecule of the resulting half-blocked diisocyanate may be 1.0 to 0.5 molar equivalents, preferably 0.99 to 0.88 molar equivalents. When the amount of the unblocked isocyanate group is larger than 1.0 molar equivalent, gelation is likely to be arisen at the time of reacting with the epoxy resin. On the other hand, when the amount of the unblocked isocyanate group is smaller than 0.5 molar equivalents, the amount of full-blocked polyisocyanate which has not reacted with the epoxy resin increases and reduces water solubility.

The polyisocyanate which can be used may be anyone which contains two or more isocyanate groups per molecule and is not particularly limited. Typical examples thereof include aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, ethylidyne diisocyanate, butylidene diisocyanate, etc.; alicyclic diisocyanates such as isophorone diisocyanate, 1,3-cyclopentane diisocyanate, 1,4-cyclohexane diisocyanate, 1,2-cyclohexane diisocyanate, etc.; aromatic diisocyanates such as m-phenylene diisocyanate, p-phenylene diisocyanate, 4,4'-diphenyl diisocyanate, 1,5-naphthalene diisocyanate, 1,4-dinaphthalene diisocyanate, etc.; aliphatic-aromatic diisocyanates such as 4,4'-diphenylenemethane diisocyanate, 2,4- or 2,6-tolylene diisocyanate or a mixture thereof or a dimer thereof, 4,4'-toluidine diisocyanate, 1,4-xylylene diisocyanate, etc.; polynuclear substituted diisocyanates such as dianisidine diisocyanate, 4,4'-diphenyl ether diisocyanate, chlorodiphenylene diisocyanate, etc.

Examples of particularly preferred polyisocyanate include hexamethylene diisocyanate, isophorone diisocyanate, 1,4-cyclohexane diisocyanate, m-phenylene diisocyanate, p-phenylene diisocyanate, 4,4'-diphenylenemethane diisocyanate, 2,4- or 2,6-tolylene diisocyanate or a mixture thereof.

It is preferred that the polyisocyanate used in the present invention contains isocyanate groups having different reactivities in a molecule, which may be advantageous for a partial blocking reaction.

Examples of the active hydrogen compound used for preparing the half-blocked diisocyanate include alcohol, amine, carboxylic acid, oxime and caprolactam having 1 to 20 carbon atoms.

As the alcohol, there can be used aliphatic alcohols, alicyclic alcohols and phenols. Examples thereof include aliphatic alcohols such as methanol, ethanol, propanol, butanol, amyl alcohol, hexyl alcohol, 2-ethylhexyl alcohol, heptyl alcohol, octyl alcohol, nonyl alcohol, 3,3,5-trimethyl hexanol, decyl alcohol, lauryl alcohol, stearyl alcohol, ethylene glycol monomethyl ether, ethylene glycol monoethyl ether, ethylene glycol monobutyl ether, propylene glycol monomethyl ether, diethylene glycol monomethyl ether, diethylene glycol monomethyl ether, benzyl alcohol, etc.; alicyclic alcohols such as cyclohexanol, etc.; phenols such as phenol, crezol, xylenol, chlorophenol, ethylphenol, etc.

Examples of the amine include xylidine, aniline, butylamine, dibutylamine and the like. Examples of the carboxylic acid include formic acid, acetic acid, propionic acid, octylic acid, stearic acid and the like. Examples of the oxime include formamide oxime, acetaldoxime, acetoxime, methylethylketoxime, diacetyl monooxime, cyclohexane oxime and the like. Examples of the lactam include ε-caprolactam, δ-valerolactam, γ-butyrolactam, β-propiolactam and the like.

Examples of particularly preferred active hydrogen-containing compound include ethylene glycol monomethyl ether, ethylene glycol monoethyl ether, ethylene glycol monobutyl ether, propylene glycol monomethyl ether, diethylene glycol monomethyl ether, diethylene glycol monomethyl ether, phenol, methylethylketoxime and ε-caprolactam.

The epoxy resin which can be used in the present invention may be a so-called polyepoxide having at least one 1,2-epoxy group per molecule. An epoxy equivalent of the epoxy resin is preferably 150 to 2000, more preferably 400 to 1500. When the epoxy equivalent is smaller than 150, it is impossible to produce film at the time of electrodeposition and no film may be obtained. On the other hand, when the epoxy equivalent exceeds 2000, an amount of the cationic groups per molecule becomes insufficient and provides poor water solubility.

Examples of the epoxy resin include polyglycidyl ether of polyphenol. This polyglycidyl ether of polyphenol can be obtained by reacting polyphenol with epichrorohydrin or dichlorohydrin in the presence of an alkaline. Examples of the polyphenol include bis(4-hydroxyphenyl)-2,2-propane, 4,4-dihydroxybenzophenone, bis(4-hydroxyphenyl)-1,1-ethane and equivalents thereof.

The sulfide which can be used in the present invention is represented by the formula:

wherein $R^1$ and $R^2$ are the same as defined above. Such a sulfide can be usually obtained by reacting various thiols with epoxy compounds according to a method known to those skilled in the art. The reason why $R^1$ and $R^2$ must be different groups is that good appearance is obtained by selecting them unsymmetrically.

Example thereof include 1-(2-hydroxyethylthio)-2-propanol, 1-(2-hydroxyethylthio)-2,3-propanediol, 1-(2-hydroxyethylthio)-2-butanol, 1-(2-hydroxyethylthio)-3-butoxy-1-propanol, 1-(2-hydroxyethylthio)-2,3-methanediol, 1-(2-hydroxyethylthio)-2,3-ethanediol, 1-(2-hydroxyethylthio)-2,3-propanediol, 1-(2-hydroxyethylthio)-2,3-butanediol, 1-(2-hydroxypropylthio)-2,3-propanediol and the like.

The pigment paste of the present invention can be prepared by formulating the pigment grinding resin of the present invention thus obtained and a pigment in a weight ratio of from 1:0.05 to 1:10, preferably from 1:0.1 to 1:5, according to a method known to those skilled in the art.

The pigment may be anyone which is usually used and is not specifically limited. Examples thereof include iron oxide, strontium chromate, carbon black, titanium dioxide, talc, barium sulfate, cadmium yellow, cadmium red, chromic yellow, aluminum phosphomolybdate, zinc phosphomolybdate, basic lead silicate and a mixture thereof.

Further, the electrodeposition paint can be obtained by mixing the resulting pigment paste with deionized water and a cationic resin and by further adding, as auxiliary agents, additives as are well known to those skilled in the art such as resins, solvents, antioxidants, surfactants, other auxiliary agents used in the electrodeposition process.

EXAMPLES

The following Preparative Examples, Examples and Comparative Examples further illustrate the present invention in detail but are not to be construed to limit the scope thereof. In the Preparation Examples, Examples and Comparative Examples, "parts" are by weight unless otherwise stated.

Preparative Example 1

Preparation of polyurethane crosslinking agent 199.1 Parts of hexamethylene diisocyanurate was charged in a reaction vessel equipped with a stirrer, a cooling tube, a nitrogen introducing tube and a thermometer, and hexamethylene diisocyanurate was diluted with 31.6 parts of methyl isobutyl ketone (hereinafter abbreviated to "MIBK"). Then, 0.2 part of dibutyltin dilaurate was added, and after heating to 50° C., 87 parts of methylethylketooxime was added dropwise with stirring in a dry nitrogen atmosphere and the reaction temperature was maintained at 50° C. The mixture was maintained at 70° C. until the disappearance of the isocyanate group is disappeared by the measurement of infrared spectra. Thereafter, the reaction product was diluted with 35.8 parts of MIBK and 4.0 parts of n-butanol to give a polyurethane crosslinking agent.

Preparative Example 2

Preparation of aminated epoxy resin

In a reaction vessel equipped with a stirrer, a cooling tube, a nitrogen introducing tube and a thermometer, 99.8 parts of Epicoat 1001 (bisphenol A type epoxy resin having an epoxy equivalent of 475, manufactured by Yuka Shell Epoxy Co., Ltd.), 850.2 parts of Epicoat 1004 (bisphenol A type epoxy resin having an epoxy equivalent of 950, manufactured by Yuka Shell Epoxy Co., Ltd.), 55 parts of nonylphenol, 193.3 parts of MIBK and 4.5 g of benzyldimethylamine were added. Then, the mixture was reacted at 140° C. for 4 hours to give a resin having an epoxy equivalent of 1175. To the resin, 69.1 parts of ethylene glycol n-hexyl ether, 35.4 parts of a MIBK solution (solid content: 78% by weight) of MIBK ketiminated product of 2-aminoethyl ethanolamine, 26.5 parts of N-methylethanolamine and 37.1 parts of diethanolamine were added and the mixture was reacted at 120° C. for 2 hours to give the objective resin.

Preparative Example 3

Preparation of 1-(2-hydroxyethylthio)-2,3-propanediol

In a reaction vessel equipped with a stirrer, a cooling tube, a nitrogen introducing tube and a thermometer, 78.1 parts of 2-mercaptoethanol was charged, and 2-mercaptoethanol was diluted with 159.6 parts of MIBK. Then, 0.41 part of dimethylbenzylamine was added, and after heating to 50° C., 81.5 parts of glycidol was added dropwise with stirring over 3 hours in a dry nitrogen atmosphere. The reaction vessel was cooled and maintained at 50° C. 2 Hours after dropping, it was confirmed that an absorption of —SH (2540 cm$^{-1}$) and an absorption of a glycidyl group (910 cm$^{-1}$) are disappeared by the measurement of infrared spectra. Further, the reaction product had no mercapto-like odor. Thereafter, MIBK was removed under reduced pressure to give 1-(2-hydroxyethylthio)-2,3-propanediol as a viscous liquid. Yield was 90% of the charge weight.

Preparative Example 4

Preparation of 1-(2-hydroxyethylthio)-2-butanol

In a reaction vessel equipped with a stirrer, a cooling tube, a nitrogen introducing tube and a thermometer, 78.1 parts of 2-mercaptoethanol was charged, and 2-mercaptoethanol was diluted with 159.6 parts of MIBK. Then, 1.48 parts of sodium methoxide (28% solution in methanol) was added, and after heating to 50° C., 82.9 parts of butylene oxide was added dropwise with stirring over 3 hours in a dry nitrogen atmosphere. The reaction vessel was cooled and maintained at 50° C. 3 Hours after dropping, it was confirmed that an absorption of —SH (2540 cm$^{-1}$) and an absorption of a glycidyl group (910 cm$^{-1}$) are disappeared by the measurement of infrared spectra. Further, the reaction product had no mercapto-like odor. Thereafter, MIBK was removed under reduced pressure to give 1-(2-hydroxyethylthio)-2-butanol as a viscous liquid. Yield was 95% of the charge weight.

Preparative Example 5

Preparation of 1-(2-hydroxyethylthio)-3-butoxy-1-propanol

In a reaction vessel equipped with a stirrer, a cooling tube, a nitrogen introducing tube and a thermometer, 78.1 parts of 2-mercaptoethanol was charged, and 2-mercaptoethanol was diluted with 228.5 parts of MIBK. Then, 2.73 parts of sodium methoxide (28% solution in methanol) was added, and after heating to 50° C., 153.1 parts of butyl glycidyl ether was added dropwise with stirring over 3 hours in a dry nitrogen atmosphere. The reaction vessel was cooled and maintained at 50° C. 3 Hours after dropping, it was confirmed that an absorption of —SH (2540 cm$^{-1}$) and an absorption of a glycidyl group (910 cm$^{-1}$) are disappeared by the measurement of infrared spectra. Further, the reaction product had no mercapto-like odor. Thereafter, MIBK was removed under reduced pressure to give 1-(2-hydroxyethylthio)-2-propanol as a viscous liquid. Yield was 95% of the charge weight.

Example 1

Preparation of half-blocked diisocyanate 222.2 Part of isophorone diisocyanate (hereinafter abbreviated to "IPDI") was charged in a reaction vessel equipped with a stirrer, a nitrogen introducing tube and a cooling tube, and IPDI was diluted with 39.1 parts of MIBK. Then, 0.2 part of dibutyltin dilaurate was added, and after heating to 50° C., 131.5 parts of 2-ethylhexanol was added dropwise with stirring over 2 hours in a dry nitrogen atmosphere. The reaction temperature was maintained at 50° C. to give 2-ethylhexanol half-blocked IPDI (solid content: 90%).

Preparation of modified epoxy resin and pigment grinding resin 351.6 Parts of Epon 828 (epoxy resin manufactured by Shell Chemical Co., epoxy equivalent: 190) and 99.2 parts of bisphenol A were charged in a reaction vessel equipped with a stirrer, a nitrogen introducing tube and a cooling tube.

After heating to 130° C. in a nitrogen atmosphere, 1.41 part of benzyldimethylamine was added and the mixture was reacted at 170° C. for about one hour to give a bisphenol type epoxy resin having an epoxy equivalent of 450. After cooling to 140° C., 218.3 parts of 2-ethylhexanol half-blocked IPDI prepared hereinabove (solid content: 196.5 parts) was added and the reaction was conducted.

The mixture was maintained at 140° C. for one hour and diluted with 172.3 parts of dipropylene glycol monobutyl ether. Then, the reaction mixture was cooled to 100° C., and 408.0 parts of 1-(2-hydroxyethylthio)-2-propanol ("SHP-100" manufactured by Sanyo Kasei k.k., solid content: 189.4 parts), 134.0 parts of dimethylolpropionic acid and 144.0 parts of deionized water were added. The mixture was reacted at 70° to 75° C. until an acid value becomes 3.0 or less to give a resin having a tertiary sulfonium conversion ratio of 70.6%. This was diluted with 324.8 parts of dipropylene glycol monobutyl ether to give a pigment grinding resin (solid content: 50%).

Example 2

According to the same manner as that described in Example 1 except for using 568.2 parts of 1-(2-hydroxyethylthio)-2,3-propanediol (solid content: 189.4 parts) obtained in Preparative Example 3 in place of SHP-100, and using 101.1 parts and 323.6 parts of dipropylene glycol monobutyl ether, a pigment grinding resin having a tertiary sulfonium modification rate of 72.6% was obtained.

Example 3

According to the same manner as that described in Example 1 except for using 483.3 parts of 1-(2-hydroxyethylthio)-2-butanol (solid content: 161.1 parts) obtained in Preparative Example 4 in place of SHP-100, and using 138.9 parts and 314.1 parts of dipropylene glycol monobutyl ether, a pigment grinding resin having a tertiary sulfonium conversion ratio of 72.7% was obtained.

Example 4

According to the same manner as that described in Example 1 except for using 462.6 parts of 1-(2-hydroxyethylthio)-3-butoxy-1-propanol (solid content: 231.3 parts) obtained in Preparative Example 5 in place of SHP-100, and using 277.6 parts and 337.5 parts of dipropylene glycol monobutyl ether, a pigment grinding resin having a tertiary sulfonium conversion ratio of 56.1% was obtained.

Example 5

According to the same manner as that described in Example 1 except for using 21.8 parts of half blocked IPDI (solid content: 19.7 parts) instead of 218.3 parts of it, and using 40.7 parts and 255.2 parts of dipropylene glycol monobutyl ether, a pigment grinding resin having a tertiary sulfonium conversion ratio of 81.0% was obtained.

Comparative Example 1

Preparation 1 of pigment grinding resin derived from thiodiethanol 376.0 Part of Epon 828 and 114.0 parts of bisphenol A were charged in a reaction vessel equipped with a stirrer, a nitrogen introducing tube and a cooling tube. After heating to 130° C. in a nitrogen atmosphere, 0.75 part of benzyldimethylamine was added and the mixture was reacted at 170° C. for about one hour to give a bisphenol type epoxy resin having an epoxy equivalent of 490. After cooling to 140° C., 198.4 parts of 2-ethylhexanol half-blocked IPDI (solid content: 178.6 parts) was added and maintained at 140° C. for 1 hour.

The resulting epoxy resin was diluted with 161.8 parts of dipropylene glycol monobutyl ether. Then, the reaction mixture was cooled to 100° C., and 366.0 parts of 2,2'-thiobis(ethanol) (solid content: 122.1 parts), 134.0 parts of dimethylolpropionic acid and 144.0 parts of deionized water were added. The mixture was reacted at 70° to 75° C. until an acid value becomes 3.0 or less to give a resin having a tertiary sulfonium conversion ratio of 72%. This was diluted with 353.5 parts of dipropylene glycol monobutyl ether to give a pigment grinding resin (solid content: 50%).

Comparative Example 2

Preparation 2 of pigment grinding resin derived from thiodiethanol 533.2 Part of Epon 828, 199.6 parts of bisphenol A and 19.2 parts of nonylphenol were charged in a reaction vessel equipped with a stirrer, a nitrogen introducing tube and a cooling tube. After dissolved bisphenol A by heating the mixture to 107° C. in a nitrogen atmosphere, 0.75 part of benzyldimethylamine was added and the mixture was reacted at 125° C. The resulting reaction mixture was cooled to 75° C., 201.6 parts propylene glycol monobutyl ether, 122.1 parts of 2,2'-thiobis(ethanol), 134.1 parts of dimethylolpropionic acid and 30.6 parts of deionized water were added. The mixture was reacted at 70° to 75° C. until an acid value becomes 3.0 or less. This was diluted with water to be a solid content of 30% by weight to give a pigment grinding resin.

Comparative Example 3

Preparation of quaternizing agent 174.0 Parts of tolylene diisocyanate (hereinafter abbreviated to "TDI") was charged in a reaction vessel equipped with a stirrer, a nitrogen introducing tube and a cooling tube, and after diluting with 33.9 parts of MIBK, 0.2 part of dibutyltin dilaurate was added. After heating to 50° C., 131.5 parts of 2-ethylhexanol was added dropwise with stirring over 2 hours in a dry nitrogen atmosphere to conduct the dropping reaction. The reaction temperature was maintained at 50° C. to give 2-ethylhexanol half-blocked TDI. 320.0 Parts of this 2-ethylhexanol half-blocked TDI (solid content: 304.0 parts) was added to 87.2 parts of dimethylethanolamine at room temperature, and as a result, exothermic reaction occurred. After stirring at 80° C. for one hour, 117.6 parts of an aqueous 75% lactic acid (solid content: 88.2 parts) was added and 39.2 parts of ethylene glycol monobutyl ether was further added. The reaction mixture was stirred at 65° C. for about half an hour to give a quaternizing agent.

Preparation of pigment grinding resin containing quaternary ammonium group 681.2 Parts of Epon 828 (bisphenol A type epoxy resin having an epoxy equivalent of 190, manufactured by Yuka Shell Co., Ltd.) and 289.6 parts of bisphenol A were charged in a reaction vessel equipped with a stirrer, a nitrogen introducing tube and a cooling tube, and the mixture was reacted at 150° to 160° C. for about one hour in a nitrogen atmosphere. After cooling to 120° C. 406.4 parts of 2-ethylhexanol half-blocked TDI (solid content: 386.1 parts) was added. After cooling to 85° to 95° C. and homogenizing, 496.3 parts of the quaternizing agent (solid content: 421.9 parts) prepared hereinabove and 71.2 parts of deionized water were added. The reaction mixture was maintained at 80° to 85° C. until an acid value becomes 1 or less. Then, the mixture was diluted with 85.6 parts of ethylene glycol monobutyl ether to give a pigment grinding resin.

Example 6

Preparation 1 of pigment paste 30.0 Parts of a pigment grinding resin (solid content: 15.0 parts) prepared in Example 1, 75.4 parts of deionized water, 68.9 parts of titanium dioxide R-900P, 14.4 parts of kaolin, 15.0 parts of aluminum phosphomolybdate and 1.7 parts of carbon black were dispersed using a sand grind mill to prepare a pigment paste ground to a particle size of 10 μ or less. This pigment paste had a total solid content of 56.0%, a solid content of 7.3% and a pigment solid content of 48.7%.

Example 7

Preparation 2 of pigment paste

According to the same manner as that described in Example 6 except for using a pigment grinding resin of Example 2 in place of a pigment grinding resin of Example 1, a pigment paste was prepared.

Example 8

Preparation 3 of pigment paste

According to the same manner as that described in Example 6 except for using a pigment grinding resin of Example 5 in place of a pigment grinding resin of Example 1, a pigment paste was prepared.

Comparative Example 4

Preparation 4 of pigment paste

According to the same manner as that described in Example 6 except for using a pigment grinding resin of Comparative Example 1 in place of a pigment grinding resin of Example 1, a pigment paste was prepared.

Comparative Example 5

Preparation 5 of pigment paste

According to the same manner as that described in Example 6 except for using a pigment grinding resin of Comparative Example 2 in place of a pigment grinding resin of Example 1, a pigment paste was prepared.

Comparative Example 6

Preparation 6 of pigment paste

According to the same manner as that described in Example 6 except for using a pigment grinding resin of Comparative Example 3 in place of a pigment grinding resin of Example 1, a pigment paste was prepared.

Example 9

Evaluation of storage stability of pigment paste

Regarding pigment pastes prepared in Examples 6 to 8 and Comparative Examples 4 to 6, the storage stability of the pigment paste was evaluated by observing the state of the sedimentation after storing at 40° C. for 2 weeks. The evaluation results are shown in Table 1.

TABLE 1

| Example No. | Storage stability[1] | Change in viscosity[2] |
| --- | --- | --- |
| Example 6 | ○ | 2.0 |
| Example 7 | ○ | 4.0 |
| Example 8 | Δ | 9.0 |
| Comp. Example 4 | ○ ~ Δ | 8.0 |
| Comp. Example 5 | Δ ~ x | —[3] |
| Comp. Example 6 | ○ ~ Δ | 12.0 |

[1] After storing at 40° C. for 2 weeks, the state of the sedimentation of the paste was evaluated by visual check according to the following evaluation standard.
○: No sedimentation
Δ: Soft sedimentation
x: Hard sedimentation
[2] Change in viscosity of the paste after storing at 40°C. for 2 weeks (unit: Ku)
[3] Impossible to measure Example 10

Preparation 1 of cationic electrodeposition paint 331.9 Parts of a polyurethane crosslinking agent obtained in Preparative Example 1 and 576.0 parts of an aminated epoxy resin obtained in Preparative Example 2 were mixed with 30.3 parts of n-hexyl cellosolve, and after neutralizing with 12.3 parts of glacial acetic acid, the mixture was diluted slowly with 1067.0 parts of deionized water. Then, the organic solvent was removed under reduced pressure until the solid content becomes 36.0%. 546.8 Parts of a pigment paste prepared in Example 6 was added and the mixture was uniformly mixed, and then 2598.2 parts of deionized water was added to give a cationic electrodeposition paint having a solid content of 20.0%.

Example 11

Preparation 2 of cationic electrodeposition paint

According to the same manner as that described in Example 10 except for substituting a pigment paste prepared in Example 6 for that prepared in Example 7, a cationic electrodeposition paint was obtained.

Example 12

Preparation 3 of cationic electrodeposition paint

According to the same manner as that described in Example 10 except for substituting a pigment paste prepared in Example 6 for that prepared in Example 8, a cationic electrodeposition paint was obtained.

Comparative Example 7

Preparation 4 of cationic electrodeposition paint

According to the same manner as that described in Example 10 except for substituting a pigment paste prepared in Example 6 for that prepared in Comparative Example 4, a cationic electrodeposition paint was obtained.

Example 8

Preparation 5 of cationic electrodeposition paint

According to the same manner as that described in Example 10 except for substituting a pigment paste prepared in Example 6 for that prepared in Comparative Example 5, a cationic electrodeposition paint was obtained.

Comparative Example 9

Preparation 6 of cationic electrodeposition paint

According to the same manner as that described in Example 10 except for substituting a pigment paste prepared in Example 6 for that prepared in Comparative Example 6, a cationic electrodeposition paint was obtained.

Example 13

Evaluation of storage stability of cationic electrodeposition paint

The storage stability of cationic electrodeposition paints obtained in Examples 10 to 12 and Comparative Examples 7 to 9 was evaluated with the amount having passed through a 380 mesh filter and the amount of residue measured with the electrodeposition paint having been stored for 4 weeks at 40° C. under stirring. The results are shown in Table 2.

Evaluation of appearance of the coated film

A cold-rolled steel sheet treated with zinc phosphate was dipped in distilled water by first, and then in an electrodeposition cell filled with the electrodeposition paint. After 10 seconds from the dipping, the electrodeposition cell was charged with electricity to electrodeposit a film onto a surface of the sheet in a thickness of 20 µ. Then, the formed film was baked at 160° C. for 10 minutes and evaluated appearance of the coated film by visual check. The results are shown in Table 2.

Evaluation of corrosion resistance to salty water cationic electrodeposition paint The above cationic electrodeposition paint was electrodeposited on a cold-rolled steel sheet (without a zinc phosphate treatment) in a thickness of 10 µ and, after baking at 160° C. for 10 minutes, cross-cut was made into the paint film and the specimen was immersed for 120 hours by a salt water spray test (SST). Then, an adhesive tape 2.4 cm in width (manufactured by Nichiban Co., Ltd., trade name "Cello tape") was applied securely on the specimen by finger, and the adhesive tape was quickly peeled off. The salt water corrosion resistance of the electrodeposition paint was evaluated by measuring the width of peeling of the paint film from the steel sheet. The results are shown in Table 2.

TABLE 2

| Example No. | Storage stability[1] | Appearance of coating[2] | Corr. resistance to salty water[3] |
|---|---|---|---|
| Ex. 10 | ◯ (3 mg) | ◯ | ◯ |
| Ex. 11 | ◯ (5 mg) | ◯ | ◯ |
| Ex. 12 | ◯ (25 mg) | ◯ | ◯ |
| Comp. Ex. 10 | Δ (7 mg) | Δ | ◯ |
| Comp. Ex. 11 | Δ (>100 mg) | Δ | ◯ |
| Comp. Ex. 12 | ◯ (18 mq) | ◯ | x |

[1] The storage stability of the electrodeposition paint was evaluated with the amount having passed through a 380 mesh filter and the amount of residue measured with the electrodeposition paint having been stored for 4 weeks at 40° C. under stirring, according to the following standard:
◯: filtered smoothly
Δ: hard to filter
x: not filtered due to clogging.
Further, the weight in parentheses indicates the filtration residual amount.
[2] Evaluation standard of appearance of coating
◯: no crawling nor cratering
Δ: slight cratering
x: crawling over the coating surface.
[3] Evaluation standard of corrosion resistance to salty water
◯: Width of peeling is less than 2 mm
Δ: Width of peeling is 2 to 3 mm
x: Width of peeling is 3 mm or more.

What is claimed is:

1. A pigment grinding resin represented by the formula:

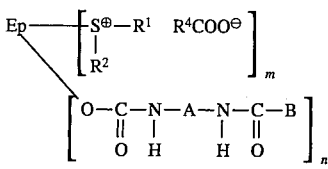

wherein, Ep is a residue of a reacted epoxy resin of which the starting unreacted epoxy resin has an epoxy equivalent of 150 to 2000 and a hydroxyl group equivalent of 300 to 4000; $R^1$ represents a hydrophilic group selected from the group consisting of a 2-hydroxyethyl group and a group of the formula $-CH_2CH(OH)CH_2R^3$ wherein, $R^3$ is a hydroxyl group or a hydroxylalkyl group having 1 to 10 carbon atoms; $R^2$ represents a hydrophilic group selected from the group consisting of 3-hydroxypropyl, 2-hydroxypropyl and 4-hydroxybutyl; $R^4$ is selected from the group consisting of a hydrogen atom and alkyl, hydroxylalkyl and alkylamide groups having 1 to 5 carbon atoms; m is a numerical value of 0.1 to 2.0; A is a residue of diisocyanate selected from the group consisting of aliphatic, alicyclic and aromatic diisocyanates having 4 to 20 carbon atoms; B is a residue of a compound selected from the group consisting of an alcohol, an amine, a carboxylic acid, an oxime and a caprolactam having 1 to 20 carbon atoms; and n is a numerical value of 10.1 to 2.0

2. The pigment grinding resin for an electrodeposition paint according to claim 1, wherein the A is a residue of diisocyanate selected from the group consisting of hexamethylene diisocyanate, isophorone diisocyanate, 1,4-cyclohexane diisocyanate, m-phenylene diisocyanate, p-phenylene diisocyanate, 4,4'-diphenylenemethane diisocyanate, 2,4- or 2,6-tolylene diisocyanate and a mixture thereof.

3. The pigment grinding resin for an electrodeposition paint according to claim 1, wherein the B is a residue of an active hydrogen-containing compound selected from the group consisting of ethylene glycol monomethyl ether, ethylene glycol monoethyl ether, ethylene glycol monobutyl ether, propylene glycol monomethyl ether, diethylene glycol monomethyl ether, diethylene glycol monomethyl ether, phenol, methylethylketoxime and ε-caprolactam.

4. The pigment grinding resin for an electrodeposition paint according to claim 1 having a tertiary sulfonium group value of from 30 to 500.

5. The pigment grinding resin for an electrodeposition paint according to claim 1 having a blocked isocyanate group equivalent of from 100 to 40000.

6. A pigment paste for an electrodeposition paint containing a pigment and the pigment grinding resin composition according to any one of claims 1 to 4.

7. The pigment paste for an electrodeposition paint according to claim 6, wherein the pigment is selected from the group consisting of iron oxide, strontium chromate, carbon black, titanium dioxide, talc, barium sulfate, cadmium yellow, cadmium red, chromic yellow, aluminum phosphomolybdate, zinc phosphomolybdate, basic lead silicate and a mixture thereof.

8. The pigment paste for an electrodeposition paint according to claim 6, wherein the pigment grinding resin is contained in a proportion of from 0.05 to 10 based on the weight of the pigment.

9. A pigment grinding resin represented by the formula:

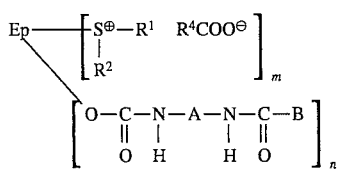

wherein, Ep is a residue of a reacted epoxy resin of which the starting unreacted epoxy resin has an epoxy equivalent of 150 to 2000 and a hydroxyl group equivalent of 300 to 4000; $R^1$ represents a 2-hydroxyethyl group; and $R^2$ represents a 2-hydroxypropyl group; $R^4$ is selected from the group consisting of a hydrogen atom and alkyl, hydroxylalkyl and alkylamide groups having 1 to 5 carbon atoms; m is a numerical value of 0.1 to 2.0; A is a residue of a diisocyanate selected from the group consisting of aliphatic, alicyclic and aromatic diisocyanates having 4 to 20 carbon atoms; B is a residue of a compound selected from the group consisting of an alcohol, an amine, a carboxylic acid, an oxime and a caprolactam having 1 to 20 carbon atoms; and n is a numerical value of 10.1 to 2.0.

* * * * *